(12) United States Patent
Nakayama et al.

(10) Patent No.: US 7,724,433 B2
(45) Date of Patent: *May 25, 2010

(54) COMPOSITION FOR MULTI-COLOR DISPLAY MATERIAL AND MANUFACTURING METHOD THEREOF, AND OPTICAL DEVICE AND DISPLAYING METHOD THEREOF

(75) Inventors: Daisuke Nakayama, Minamiashigara (JP); Ryojiro Akashi, Minamiashigara (JP)

(73) Assignee: Fuji Xerox Co., Ltd., Tokyo (JP)

( * ) Notice: Subject to any disclaimer, the term of this patent is extended or adjusted under 35 U.S.C. 154(b) by 712 days.

This patent is subject to a terminal disclaimer.

(21) Appl. No.: 11/445,379

(22) Filed: Jun. 1, 2006

(65) Prior Publication Data
US 2007/0115550 A1    May 24, 2007

(30) Foreign Application Priority Data
Nov. 21, 2005    (JP) .............................. 2005-336142

(51) Int. Cl.
*G02B 27/28*    (2006.01)
*G02B 5/30*    (2006.01)

(52) U.S. Cl. ........................... 359/483; 359/485; 349/2; 315/169.4; 252/582

(58) Field of Classification Search ............... 252/582; 359/296, 483, 485
See application file for complete search history.

(56) References Cited

U.S. PATENT DOCUMENTS

| 6,785,035 B2 * | 8/2004 | Uematsu et al. ............. 359/265 |
| 6,876,476 B1 * | 4/2005 | Miura et al. ................. 359/252 |
| 2006/0284829 A1 * | 12/2006 | Moriyama et al. ........ 345/107 |
| 2007/0008439 A1 * | 1/2007 | Nakayama et al. ............. 349/2 |
| 2007/0206270 A1 | 9/2007 | Iwamatsu et al. |

FOREIGN PATENT DOCUMENTS

| JP | 2002-162653 | 6/2002 |
| JP | 2003-202402 | 7/2003 |
| JP | 2004-46224 | 2/2004 |
| JP | 2005-31172 | 2/2005 |
| WO | 2005/071479 | 8/2005 |

OTHER PUBLICATIONS

K. Lee, S. A. Asher, J. Am. Chem. Soc., 122, 9534 (2000).
T. Iyoda, et al., Polymer Preprints, Japan, 50 (3), 472 (2001).
H. Fudouzi and U. Xia, Adv. Mater., 15, 892-896 (2003).
A document of Iridigm Corp (USA).

* cited by examiner

*Primary Examiner*—Ling-Siu Choi
*Assistant Examiner*—Bijan Ahvazi
(74) *Attorney, Agent, or Firm*—Fildes & Outland, P.C.

(57) ABSTRACT

A composition for multi-color display material, including a periodic structure having a void structure inside that communicates with the outside, and a mobile particle that is selectively disposed inside or outside of the void structure of the periodic structure.

15 Claims, 7 Drawing Sheets

COMPOSITION FOR MULTI-COLOR DISPLAY MATERIAL AND MANUFACTURING METHOD THEREOF, AND OPTICAL DEVICE AND DISPLAYING METHOD THEREOF

CROSS-REFERENCE TO RELATED APPLICATION

This application claims priority under 35 USC 119 from Japanese Patent Application No. 2005-336142, the disclosure of which is incorporated by reference herein.

BACKGROUND

1. Technical Field

The present invention relates to a composition for multi-color display material that makes use of a periodic structure and a manufacturing method thereof. In addition, the present invention relates to an optical device that is applied in, for example, a display device or a light modulating device and a displaying method thereof.

2. Related Art

In recent years, displaying and color controlling devices that use color generation mechanisms based on "structural color" that utilizes a sub-micro scale periodic structure (regular structure) have been proposed. To date, color generation of structural colors that use periodic structural structures utilizing colloidal crystals that use monodispersed particle of silica or a polymer, a micro-domain structure of a block copolymer, and a lamellar structure of a surfactant have been reported.

In particular, there are many reports on periodic structural structures utilizing colloidal crystals, and they can be categorized into two kinds of structural structures, namely, a loosely-packed type that makes use of the repulsive force between particles, and a closest packed type where particles are closely packed.

SUMMARY

According to an aspect of the invention, a composition for multi-color display material includes a periodic structure having a void structure inside that communicates with the outside; and a mobile particle that is selectively disposed inside or outside of the void structure of the periodic structure.

BRIEF DESCRIPTION OF THE DRAWINGS

Exemplary embodiments of the present invention will be described in detail based on the following figures, wherein:

FIG. 3A to B are a schematic view showing an example of localizing the mobile particle in the void structure of the periodic structure in the optical device relating to the exemplary embodiment, wherein FIG. 3A shows an example in which mobile particle has entered in the void structure, and FIG. 3B shows an example in which the mobile particle have escaped from the void structure;

DETAILED DESCRIPTION

The foregoing description of the embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

More specifically, the composition for multi-color display material according to an aspect of the invention includes a periodic structure having a void structure inside that communicates with the outside, and a mobile particle that is selectively disposed inside or outside of the void structure of the periodic structure.

In the composition for multi-color display material according to an aspect of the invention, the periodic structure may be a porous structure.

In the composition for multi-color display material according to an aspect of the invention, the material of the periodic structure may be colored, or the material of the periodic structure may be not colored.

In the composition for multi-color display material according to an aspect of the invention, the mobile particle may be a metallic nanoparticle. The metallic nanoparticle may be at least one selected from gold, silver, titanium oxide, silica and zinc oxide.

On the other hand, the optical device according to an aspect of the invention is includes a pair of substrates; a composition for multi-color display material located between the pair of substrates, and including a periodic structure having a void structure inside that communicates with the outside, and a mobile particle that is selectively disposed inside or outside of the void structure of the periodic structure; and a selection and arrangement section that selectively disposes the mobile particle inside or outside of the void structure of the periodic structure.

In the optical device according to an aspect of the invention, the periodic structure may be a porous structure.

In the optical device according to an aspect of the invention, the material of the periodic structure may be colored, or the material of the periodic structure may be not colored.

In the optical device according to an aspect of the invention, the mobile particle may be a metallic nanoparticle. The metallic nanoparticle may be at least one selected from gold, silver, titanium oxide, silica and zinc oxide.

In the optical device according to an aspect of the invention, one of the pair of substrates may be colored, or have a colored material.

The displaying method for an optical device according to an aspect of the invention is a displaying method for an optical device including the composition for multi-color display material according to an aspect of the invention. The displaying method for an optical device according to an aspect of the invention includes transferring the mobile particle to the inside of the void structure of the periodic structure, and transferring the mobile particle to outside of the void structure of the periodic structure.

In the displaying method for an optical device according to an aspect of the invention, multi-color display can be performed by variation in the ratio of abundance of the mobile particle inside of the void structure of the periodic structure. Alternatively, multi-color display can be also performed by localizing the mobile particle inside of the void structure of the periodic structure.

In the displaying method for an optical device according to an aspect of the invention, the material color of the periodic structure is displayed when the structural color of the periodic structure is not colored, or when the structural color of the periodic structure shows no coloration due to the transfer of the mobile particle to the inside of the void structure of the periodic structure.

Preferred exemplary embodiments according to an aspect of the invention will be described hereinafter in detail. Numerals that have substantially same functions in all drawings are denoted by the same reference numerals, and explanations therefor may be omitted.

Figure 1:
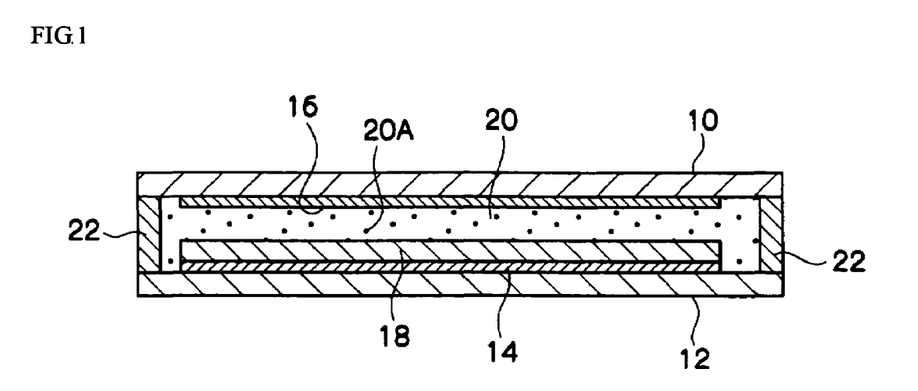
FIG. 1 is a schematic diagram showing the optical device relating to the exemplary embodiment.

FIG. 1 is a schematic diagram showing an optical device according to an exemplary embodiment. The optical device according to the exemplary embodiment, as shown in FIG. 1, has a transparent substrate 10 and a back substrate 12 which face each other with a predetermined gap therebetween provided by a spacer 22. The optical device has a pair of electrodes, namely, a first electrode 14 and a second electrode 16. Further the optical device has a periodic structure 18 and a dispersion medium 20 as a composition for multi-color display material. The first electrode 14, the second electrode 16 the periodic structure 18 and the dispersion medium 20 are disposed within the gap between the transparent substrate 10 and the back substrate 12. Further, in the dispersion medium 20, charge mobile particles 20A are dispersed as mobile particles.

The periodic structure 18 is brought into contact with the first electrode 14 as a layer and is disposed on a surface of the back substrate 12 together with the first electrode 14. On the other hand, the gap between the substrates is filled with the dispersion medium 20 which is brought into contact with the periodic structure 18 and is brought into contact with the second electrode 16 disposed on a surface of one of the transparent substrates 10.

Firstly, the periodic structure 18 will be described. Usable periodic structure 18 is those which have a periodic structure in which two or more regions having different refractive indices on the order of light wavelength are periodically disposed on a sub-micro scale, and which interfere with visible light to develop the structural color intrinsic to the periodic structure under certain conditions. Of course in the periodic structure 18, the structural color intrinsic to the structure may be not colored or the structural color does not exist in the visible region, and the periodic structure 18 alone shows its material color. The periodic structure 18 may be allowed to show a predetermined structural color by the after-mentioned mobile particle that varies the average refractive index to make the structural color reach the visible region. The periodic structure 18 optimized for optical devices are also referred to as photonic crystal structure.

The material of the periodic structure 18 may be colored, or may be not colored. The material color of the periodic structure 18 can be displayed when the structural color of the periodic structure 18 is not colored, or the structural color shows no coloration (or outside the visible region) by variation in the average refractive index by the after-mentioned mobile particles. For example, when the material color of the periodic structure 18 is black (colored), the optical device can display a black color when the structural color is outside the visible region. On the other hand, when the material color of the periodic structure 18 is transparent (show no coloration), the optical device can transmit light when the structural color is outside the visible region.

The periodic structure 18 has a void structure inside that communicates with the outside so as to allow the charge mobile particle 20A (mobile particle) can enter in. Examples of such void structure include, for example, a porous structure.

Specific examples of the periodic structure 18 include positive structural structures such as a colloidal crystal structure, a micro-domain structure, and a lamellar structure, and a negative structure using these positive structure structures as the template. Positive structural structures are given a void structure (porous structure) by gaps between unit structural structures (ex. particles). Negative structural structures are given a void structure (porous structure) by packing a templated material into the gaps between the unit structural structures (ex. particles) of a positive structure, and then removing the structural structures. The structural color intrinsic to these structural structures can be changed by allowing the charge mobile particle 20A (mobile particles) to enter in the gaps between the structural structures, or come out from the gaps between the structural structures.

The periodic structure 18 may be electrically insulating, or may be electrically conductive. For example, the periodic structure 18 may have electrical conductivity at least on its surface when the structure also serves as an electrode. The negative structural structures typically do not have electrical conductivity. Therefore positive structural structures in which the surface of the negative structural structures is covered with an electrically conductive material, and negative structural structures made by filling gaps between the unit structural structures (ex. particles) of the positive structural structures with an electrically conductive material, and then removing the structural structures (so-called hollow structural structures) are applied as the negative structural structures.

The mobile particle 20A (mobile particle) is able to readily enter in and come out of the void structure such that the mobile particle 20A (mobile particles) are selectively disposed inside or outside of the void structure of the periodic structure 18. Therefore, the void structure (including a communication path for communicating with the outside) is larger than the predetermined size. In addition, display of the structural color of the periodic structure 18 requires that the wavelength of light reflected by the periodic structure 18 is within the range of visible light.

Accordingly, the longitudinal diameter of the pores forming the void structure may be in the range from 10 to 1,000 nm. If the longitudinal diameter of the pores forming the void structure is less than 10 nm or exceeding 1,000 nm, the wavelength of light reflected by the periodic structure 18 may be substantially outside the range of visible light, which may limit the color variation achieved by the action of the mobile particle. Further, a communication path (hole) must be present between pores making the void structure or between the pores and outside, and the longitudinal diameter of the communication path (hole) may be in the range from 1 to 1,000 nm. If the longitudinal diameter of the communication path (hole) is less than 1 nm, the movement of the particle may be limited, and if exceeding 1,000 nm, the strength of the porous structure may be decreased.

The size of the pores forming the void structure, and the communication path (hole) between the pores forming the void structure or between the pores and outside was measured by a scanning electron microscope (SEM, trade name: VE-9800, manufactured by Keyence Corp.).

Here, as the colloidal crystal structure, there are two types, one of which is a loose-packed structure where the repulsion force between colloidal particles are used to pack and the other of which is a closest packed structure where colloidal particles are closely packed. The colloidal particles include particles having, for example, a volume average particle diameter in the range of 10 to 1000 nm. Such particles include silica particles, polymer particles (polystyrene, polyester, polyimide, polyolefin, polymethyl(meth)acrylate, polyethylene, polypropylene, polyether sulfone, nylon, polyurethane, polyvinyl chloride and polyvinylidene chloride) and inorganic particles such as titanium oxide.

Such colloidal particle crystalline structure can be prepared by, for example, an emulsion polymerization, a suspension polymerization, a two-stage mold polymerization, a chemical gas-phase reaction method, a heating method with an electric furnace, a thermal plasma method, a laser heating method, a vaporization method in gas, a co-precipitation method, a homogeneous precipitation method, a compound precipitation method, a metal alkoxide method, a hydro-thermal synthesis method, a sol-gel method, an atomizing method, a freezing method and a nitrate decomposition method.

Further, the colloidal crystal structure may be formed by a method of depositing the colloid particles on a substrate by gravitation precipitation or coating and drying in self-alignment manner; or depositing the colloid particles by effect of an electric field or a magnetic field; or depositing the colloid particles on a substrate by immersing the substrate in a dispersion medium containing the colloid particles and pulling out the substrate.

A thickness of the colloidal crystal structure is in the range of 100 nm to 5 mm, preferably in the range of 500 nm to 1 mm.

Furthermore, the micro-domain structure is one that has a periodic structure of from several nanometers to sub-micrometers, which is obtained by making use of, for example, a block copolymer where different kinds of polymers are chemically bonded and the repulsion between the different kinds of polymers. As the block copolymer, for example, poly(styrene-co-isoprene) block copolymer, poly(styrene-co-butadiene) block copolymer, poly(styrene-co-vinylpyridine) block copolymer and poly(styrene-co-ethylene propylene) block copolymer are exemplified, and plural repetition units may be used. The Such a micro-domain structure can be prepared, for example, by elevating a temperature to a temperature equal to or higher than a fluid temperature followed by cooling to be solidified, or by dissolving in a solvent followed by vaporizing the solvent to be solidified.

In the micro-domain structure, the difference in the refractive indexes of the respective domains is preferably in the range of 0.1 to 10 and a characteristic length of the domain is preferably in the range of 10 to 1000 nm.

Furthermore, the lamellar structure is one of the liquid crystalline structures where molecular films are stacked in layers and stabilized owing to the repulsion force between the molecular films. As a material that forms a molecular film, a surfactant can be used.

Such a lamellar structure can be prepared, for example, by means of a sol-gel synthesis of alkoxy silane in a reaction field between the lamellar layers with multi-layer two-molecular films, for example by the use of a surfactant. Furthermore, the procedure, in which a hexagonal phase or a reverse-hexagonal phase formed by the surfactant is used as a reaction field, can also obtain a periodic structure.

In the lamellar structure, the difference in the refractive indexes of the respective layers is preferably in the range of 0.1 to 10 and an inter-layer distance is preferably in the range of 10 to 1000 nm.

Furthermore, the periodic structure can be obtained by layering materials having different refractive indexes by use of a thin layer preparation method such as a vapor deposition method, a sputtering method, a coating method or a pulling-up method.

Examples of the templated material to make the negative structure as the periodic structure 18 include acrylic resins such as thermal curing resins, ultraviolet ray curing resins, electron radiation curing resins, polyester, polyimide, and polymethyl methacrylate, polystyrene and derivatives thereof, polyethylene, polypropylene, polyamide, polyvinyl chloride, polyvinylidene chloride, polycarbonate, polyether sulfone, cellulose derivatives, fluorine-based resins, silicon-based resins, and epoxy-based resins, and polyacetal-based resins. Examples of the electrically conductive material to obtain the electrically conductive periodic structure 18 include carbon material, metals such as copper, aluminum, silver, gold, nickel, and platinum, metal oxides such as tin oxide and indium tin oxide (ITO), electrically conductive polymers such as polypyrroles, polythiophenes, polyanilines, polyphenylene vinylenes, polyacenes and polyacetylenes. Of these examples, carbon materials may be used in that the original material color is black that improves the contrast of the resulting structural color.

When a polymer is used as the templated material (including electrically conductive materials) that composes the negative structure (hollow structure) as the periodic structure 18, flexible properties (flexibility, bendability) can be imparted to the optical device.

When an electrical conductivity is imparted to the positive structure of the periodic structure 18, the positive structure can be prepared by covering a surface of the colloidal crystal structure, micro-domain structure or lamellar structure with an electrically conductive material by means of, for example, the plating or the electrolytic polymerization. After covering an electrically conductive material precursor, a process such as sintering may be applied to form an electrically conductive material.

The negative structure (hollow structure) of the periodic structure 18 can be prepared by filling gaps in the colloidal crystal structure, micro-domain structure or lamellar structure with a templated material (including electrically conductive materials) by, for example, plating or by electrolytic polymerization, and then removing the structure. The templated material (including electrically conductive materials) may be prepared by coating or packing a precursor of a templated material (including electrically conductive materials), and then applying a process such as sintering.

Figure 2:
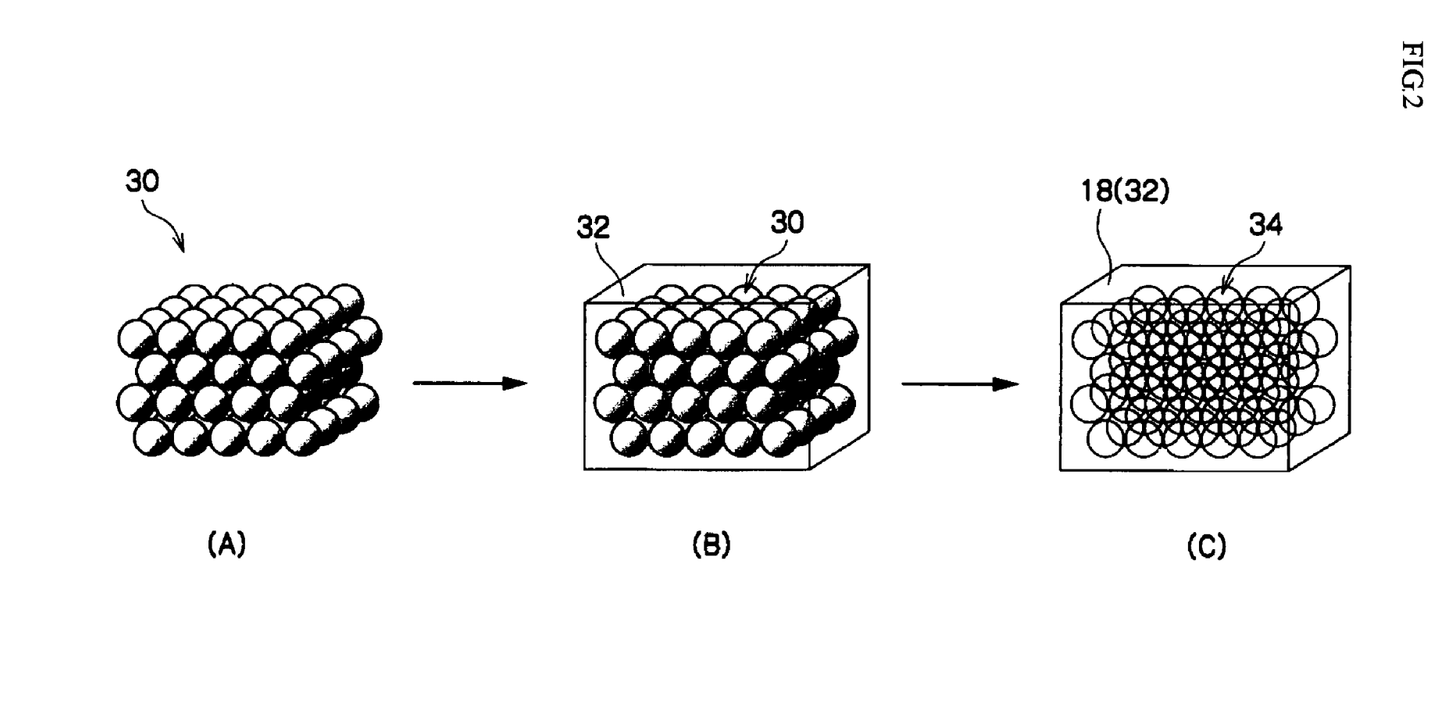
FIG. 2A to 2C are schematic views illustrating an example of the manufacturing of the periodic structure in the optical device relating to the exemplary embodiment.

Specifically, for example, as shown in FIG. 2, a colloidal crystal structure 30 made of, for example, silica particles is prepared (FIG. 2A), thereafter on surfaces and in gaps (particle gaps) of the colloidal crystal structure 30, an electrically conductive material precursor such as a furfuryl alcohol resin is coated and packed followed by sintering, so that hardly graphitizable carbon as the electrically conductive material 32 is packed (FIG. 2B). Then, when the colloidal crystal structure 30 is etched with hydrofluoric acid to be removed, a gap 34 having a same shape as the colloidal crystal structure 30 is formed (FIG. 2C). Thus, the negative periodic structure 18 made of the electrically conductive material 32 can be prepared.

Furthermore, as the periodic structure 18, a group of particles obtained by pulverizing the negative structure (hollow structure) can be applied. When the negative structure is pulverized, the interference of visible light attributed to the periodic structure itself can be randomized, and as a result, dependency of the structural color on the angle of visibility derived from the periodic structure can be improved. The pulverization of the negative structure is made to an extent that the structural color arising from the periodic structure does not disappear, that is, to the extent that the periodic structure is not destroyed and to the extent that a predetermined space (porous solid structure) can be imparted among particles. Specifically, the negative structure is pulverized so that, as a characteristic value representing a magnitude of particles, a number-average particle diameter may be in the range of approximately 100 nm to 5 mm.

When materials are selected so that the difference between the refractive indexes of the periodic structure 18 and the dispersion medium 20 may be larger, the periodic structure 18 is subdivided, or a thickness of the periodic structure 18 is made thinner, the dependency of the structural color on the angle of visibility can be improved.

Specifically, the difference between the refractive indexes of the periodic structure 18 and the dispersion medium 20 may be in the range of, for example, approximately 0.1 to 10. The respective refractive indexes can be obtained with Abbe's refractometer.

Furthermore, a subdivision of the periodic structure 18 can be made, for example, for each pixel of a square having one side in the range of 10 μm to 5 mm. Still furthermore, a thickness of the periodic structure 18 may be in the range of 500 nm to 5 mm.

Next, the charge mobile particle 20A as mobile particle will be described. The charge mobile particle 20A can be moved by the action of the electrical field (voltage). The charge mobile particle 20A (including mobile particles) can vary the average refractive index to change the structural color by entering into the void structure of the periodic structure 18.

The charge mobile particle 20A (including mobile particles) may be of a size not to scatter light when dispersed in a dispersion medium (or a size such that the dispersion medium in which the mobile particle have been dispersed is not colored and has optical transparency), and able to enter into the void structure of the periodic structure 18. More specifically, the volume-average particle diameter is preferably in the range from 1 nm to 1 μm, and more preferably 5 nm to 500 nm, and further preferably 10 nm to 100 nm. In the figure, the charge mobile particle 20A (mobile particles) is expressed in an easy-to-understand manner.

The volume-weighted average particle diameter is measured by the laser diffraction scattering method, in which laser light is irradiated to the particle group, and the average particle diameter is determined from the generated diffraction and the intensity distribution pattern of the scattered light. The measurement was performed at 25° C. using a dynamic light scattering particle diameter distribution meter (trade name: LB-550, manufactured by Horiba, Ltd.). A metallic nanoparticle is measured using a transmission electron microscope (trade name: HD-2300, manufactured by Hitachi High-Technologies Corporation.).

The charge mobile particle 20A (including mobile particles) may be those having electric charges on the surface or inside. Examples of the particle include metallic particles such as gold, silver, copper, aluminum, nickel and platinum; inorganic particles such as silica, titanium oxide and zinc oxide; polymer particles such as polystyrene, acrylic resin, polyethylene, polypropylene, polycarbonate, fluorine-based resin and silicone-based resin; and natural particles such as protein. The surface of these particles may be modified by a functional group to obtain preferable characteristics. These functional groups may be adsorbed onto the surface of the electric charge mobile particle 20A (including mobile particles) that has been added with a surfactant. Examples of the functional groups for modifying the surface of the charge mobile particle 20A (including mobile particles) includes amino groups, ammonium groups, halogen groups, hydroxyl groups, carboxyl groups, sulfonic acid groups, phosphate groups, amide groups and thiol groups. A core-shell structure may be formed by combining the materials.

The concentration (weight ratio) of the charge mobile particle 20A (including mobile particles) is varied by the volume of the void structure of the periodic structure 18, and preferably in the range from 0.01% to 70% by weight, more preferably 0.05% to 50% by weight, and more preferably 0.1% to 20% by weight with reference to the dispersion medium 20. If the concentration of the charge mobile particle 20A (including mobile particles) is too low, such particles may insufficiently contribute to the structural color change of the periodic structure 18, and if too high, some particles cannot enter into the void structure of the periodic structure 18.

Preferred examples of the charge mobile particle 20A specifically include a metallic nanoparticle, and preferable examples include at least one particle selected from gold, silver, titanium oxide, silica and zinc oxide.

In the exemplary embodiment, the charge mobile particle 20A is used as the mobile particle, and other examples of the mobile particle include magnetic mobile particles. Magnetic mobile particle is transferred by magnetic action (magnetophoresis method), and examples of which include iron oxides such as magnetite, maghemite and ferrite, and other iron oxides including other metal oxides; metals such as Fe, Co and Ni, and alloys of these metals and metals such as Al, Co, Cu, Pb, Mg, Ni, Sn, Zn, Sb, Be, Bi, Cd, Ca, Mn, Se, Ti, W and V; and mixtures thereof. More specifically, triiron tetroxide ($Fe_3O_4$), iron sesquioxide ($\gamma\text{-}Fe_2O_3$), zinc iron oxide ($ZnFe_2O_4$), yttrium iron oxide ($Y_3Fe_5O_{12}$), cadmium iron oxide ($CdFe_2O_4$), gadolinium iron oxide ($Gd_3Fe_5O_{12}$), copper iron oxide ($CuFe_2O_4$), lead iron oxide ($PbFe_{12}O_{19}$), nickel iron oxide ($NiFe_2O_4$), neodymium iron oxide ($NdFe_2O_3$), barium iron oxide ($BaFe_{12}O_{19}$), magnesium iron oxide ($MgFe_2O_4$), manganese iron oxide ($MnFe_2O_4$), lanthanum iron oxide ($LaFeO_3$), iron powder (Fe), cobalt powder (Co) and nickel powder (Ni) are included. The magnetic material in the invention at least contains magnetic iron, and as appropriate may contain one or more of magnetic materials arbitrarily selected from the above magnetic materials.

The surface of the magnetic mobile particle may be modified by a functional group to obtain preferable characteristics. These functional groups may be adsorbed onto the surface that has been added with a surfactant. Examples of the functional groups for modifying the surface include amino groups, ammonium groups, halogen groups, hydroxyl groups, carboxyl groups, sulfonic acid groups, phosphate groups, amide groups and thiol groups. A core-shell structure may be formed by other materials.

When the magnetic particle is used as the mobile particle, magnetism generating section such as electromagnet, ferrite magnet, neodymium magnet, samarium cobalt magnet, alnico magnet, rubber magnet and cap magnet are used as the selection and arrangement section.

Next, a dispersion medium 20 will be described. The dispersion medium 20 is a medium for dispersing charge mobile particles 20A (mobile particles). The dispersion medium 20 includes water, organic solvents, for example, alcohols such as methyl alcohol, ethyl alcohol, propyl alcohol, butyl alcohol, ethylene glycol and propylene glycol; ketones such as acetone and methyl ethyl ketone; ethers; and esters, dimethyl formamide, dimethyl acetamide, dimethyl sulfoxide, acetonitrile, ethylene carbonate, propylene carbonate, tetrahydrofuran, and pyrrolidone derivatives), oils (for example, aliphatic or aromatic organic solvents, and silicone oil), ionic liquids (for example, 1-ethyl-3-methyl imidazolium bromide, 1-ethyl-3-methyl imidazolium chloride, 1-ethyl-3-methyl imidazolium lactate, 1-ethyl-3-methyl imidazolium hexafluorophosphate, 1-ethyl-3-ethyl imidazolium bromide tetrafluoroborate, 1-ethyl-3-methyl imidazolium trifluoromethane sulfonate, 1-butyl-3-methyl imidazolium bromide, 1-butyl-3-methyl imidazolium chloride, 1-butyl-3-methyl imidazolium hexafluorophosphate, 1-butyl-3-methyl imidazolium bromide tetrafluoroborate, 1-butyl-3-methyl imidazolium trifluoromethane sulfonate, 1-butyl-3-methyl imidazolium lactate, 1-hexyl-3-methyl imidazolium bromide, 1-hexyl-3-methyl imidazolium chloride, 1-hexyl-3-methyl imidazolium lactate, 1-hexyl-3-methyl imidazolium hexafluorophosphate, 1-hexyl-3-methyl imidazolium bromide tetrafluoroborate, 1-hexyl-3-methyl imidazolium trifluoromethane sulfonate, 1-octyl-3-methyl imidazolium bromide, 1-octyl-3-methyl imidazolium chloride, 1-octyl-3-methyl imidazolium lactate, 1-octyl-3-methyl imidazolium hexafluorophosphate, 1-octyl-3-methyl imidazolium bromide tetrafluoroborate, 1-octyl-3-methyl imidazolium trifluoromethane sulfonate, 1-decyl-3-methyl imidazolium bromide, 1-decyl-3-methyl imidazolium chloride, 1-dectl-3-methyl imidazolium lactate, 1-decyl-3-methyl imidazolium hexafluorophosphate, 1-decyl-3-methyl imidazolium bromide tetrafluoroborate, 1-decyl-3-methyl imidazolium trifluoromethane sulfonate, 1-dodecyl-3-methyl imidazolium bromide, 1-dodecyl-3-methyl imidazolium chloride, 1-dodecyl-3-methyl imidazolium lactate, 1-dodecyl-3-methyl imidazolium hexafluorophosphate, 1-dodecyl-3-methyl imidazolium bromide tetrafluoroborate, 1-dodecyl-3-methyl imidazolium trifluoromethane sulfonate, 1-ethyl-2,3-dimethyl imidazolium bromide, 1-ethyl-2,3-dimethyl imidazolium chloride, 1-ethyl-2,3-dimethyl imidazolium lactate, 1-ethyl-2,3-dimethyl imidazolium hexafluorophosphate, 1-ethyl-2,3-dimethyl imidazolium bromide tetrafluoroborate, 1-ethyl-2,3-dimethyl imidazolium trifluoromethane sulfonate, 1-butyl-2,3-dimethyl imidazolium bromide, 1-butyl-2,3-dimethyl imidazolium chloride, 1-butyl-2,3-dimethyl imidazolium hexafluorophosphate, 1-butyl-2,3-dimethyl imidazolium bromide tetrafluoroborate, 1-butyl-2,3-dimethyl imidazolium trifluoromethane sulfonate, 1-butyl-2,3-dimethyl imidazolium lactate, 1-hexyl-2,3-dimethyl imidazolium bromide, 1-hexyl-2,3-dimethyl imidazolium chloride, 1-hexyl-2,3-dimethyl imidazolium lactate, 1-hexyl-2,3-dimethyl imidazolium hexafluorophosphate, 1-hexyl-2,3-dimethyl imidazolium bromide tetrafluoroborate, 1-hexyl-2,3-dimethyl imidazolium trifluoromethane sulfonate, 1-octyl-2,3-dimethyl imidazolium bromide, 1-octyl-2,3-dimethyl imidazolium chloride, 1-octyl-2,3-dimethyl imidazolium lactate, 1-octyl-2,3-dimethyl imidazolium hexafluorophosphate, 1-octyl-2,3-dimethyl imidazolium bromide tetrafluoroborate, 1-octyl-2,3-dimethyl imidazolium trifluoromethane sulfonate, 1-decyl-2,3-dimethyl imidazolium bromide, 1-decyl-2,3-dimethyl imidazolium chloride, 1-decyl-2,3-dimethyl imidazolium lactate, 1-decyl-2,3-dimethyl imidazolium hexafluorophosphate, 1-decyl-2,3-dimethyl imidazolium bromide tetrafluoroborate, 1-decyl-2,3-dimethyl imidazolium trifluoromethane sulfonate, 1-dodecyl-2, 3-dimethyl imidazolium bromide, 1-dodecyl-2,3-dimethyl imidazolium chloride, 1-dodecyl-2,3-dimethyl imidazolium lactate, 1-dodecyl-2,3-dimethyl imidazolium hexafluorophosphate, 1-dodecyl-2,3-dimethyl imidazolium bromide tetrafluoroborate, 1-dodecyl-2,3-dimethyl imidazolium trifluoromethane sulfonate, 1-ethylpyridinium bromide, 1-ethylpyridinium chloride, 1-ethylpyridinium lactate, 1-ethylpyridinium hexafluorophosphate, 1-ethylpyridinium tetrafluoroborate, 1-ethylpyridinium trifluoromethane sulfonate, 1-butylpyridinium bromide, 1-butylpyridinium chloride, 1-butylpyridinium lactate, 1-butylpyridinium hexafluorophosphate, 1-butylpyridinium tetrafluoroborate, 1-butylpyridinium trifluoromethane sulfonate, 1-hexylpyridinium bromide, 1-hexylpyridinium chloride, 1-hexylpyridinium lactate, 1-hexylpyridinium hexafluorophosphate, 1-hexylpyridinium tetrafluoroborate, and 1-hexylpyridinium trifluoromethane sulfonate). In particular, the ionic liquid can be used as the solvent in the dispersion medium 20. The ionic liquids have particularly a lower volatility as compared with that of other solvents; accordingly, the optical device can be stabilized over a long period of time.

Next, an electrode will be described. As constituent materials of a first electrode 14 and a second electrode 16 as a selection and arrangement section (an electrical field applying section), electrodes made of a carbon material, a metal (copper, aluminum, silver, gold, nickel, platinum, etc.), a metal oxide (tin oxide, tin-oxide-indium oxide (ITO), etc.), an electrically conductive polymer (polypyroles, polythiophenes, polyanilines, polyphenylene vinylenes, polyasens, polyacetylenes, etc.) and a composite material made of the electrically conductive polymer and particles of the metal or metal oxide can be used.

The selection and arrangement section (the electrical field applying section) is not limited to the electrode, but, may be one that is constituted of an electrically conductive material. For example, a metal such as titanium, vanadium, chromium, manganese, iron, cobalt, nickel, copper, zinc, gallium, germanium, silver, cadmium or indium; a conductive polymer such as polyacetylene, polyparaphenylene, polymethylthiophene, polypyrrole, polyaniline or polyphenylene vinylene; a resin where metal particles or carbon particles are blended with a polymer matrix to impart the electrical conductivity, or a carbon material can be exemplified.

As a constituent material of the transparent substrate 10 and the back substrate 12, a film or a planar substrate formed of polyester, polyimide, polyolefin, an acrylic resin such as a poly(meth)acrylic resin, polystyrene, polyethylene, polypropylene, polyethylene, polyether sulfone, nylon, polyurethane, polyvinyl chloride, or polyvinylidene chloride, a plate-shape substrate, a glass substrate, a metal, a metal film or ceramics can be used. In particular, when a bendable film substrate is used as the transparent substrate 10 and the back substrate 12, an optical device having the flexible properties (flexibility, bendability) can be obtained.

The back substrate 12 may be colored, or may have a colored material (for example, a colored film attached to the substrate surface). For example, when the material color of the periodic structure 18 is transparent (show no coloration) and the structural color is outside the visible region, the periodic structure 18 transmits light, which allow the display of the color of the back substrate 12 or the color of its colored material. Accordingly, for example, a black color, which is difficult to produce only by changing the structural color of the periodic structure 18, can be displayed by using a black back substrate 12 or a black colored material. In the exemplary embodiment, the colored material may also serve as the electrode 14.

The spacer 22, for example, can be made of a resin, metal oxide or glass. Furthermore, the spacers 22, though not particularly limited to, are disposed so that a gap between the substrates can be a sufficient and uniform so as to maintain a apace capable of disposing an electrically insulating solution, the periodic structure 18 and the dispersion medium 20.

The shape of the spacer 22, is not particularly restricted, as far as the spacers can stably maintain the gap. For example, spacers having an independent shape such as a circular, cubic or columnar shape can be used.

In addition, the optical device according to the exemplary embodiment, other than the above-mentioned constituent elements, may be provided with a constituent element such as a surface protective layer, a color filter layer, an UV-absorption layer, a reflection preventive layer, a wiring, an electric circuit, an IC, an LSI, and a power supply.

Each of the constituent element is constituted of a material that is non-decomposable or inert even under a voltage that applies an electrical field.

In the exemplary embodiment constituted as described above, the optical device according to the exemplary embodiment applies an electrical field to the periodic structure 18 by applying a voltage to a pair of electrodes (the first electrode 14 and the second electrode 16) as the electrical field applying section. The electrical field allows the charge mobile particle 20A to enter into the void structure 18A of the periodic structure 18 (see FIG. 3(A)). The entered charge mobile particle 20A varies the average refractive index to change the color from the structural color intrinsic to the periodic structure 18 to other colors.

On the other hand, when a voltage opposite to the above voltage is applied to a pair of electrodes (the first electrode 14 and the second electrode 16), an electrical field opposite to the above electrical field is imparted to the periodic structure 18. The opposite electrical field expels the charge mobile particle 20A from the void structure 18A of the periodic structure 18 (see FIG. 3(B)). Elimination of the charge mobile particle 20A from the void structure 18A of the periodic structure 18 varies the average refractive index to change the color to the structural color intrinsic to the periodic structure.

Figure 3A:
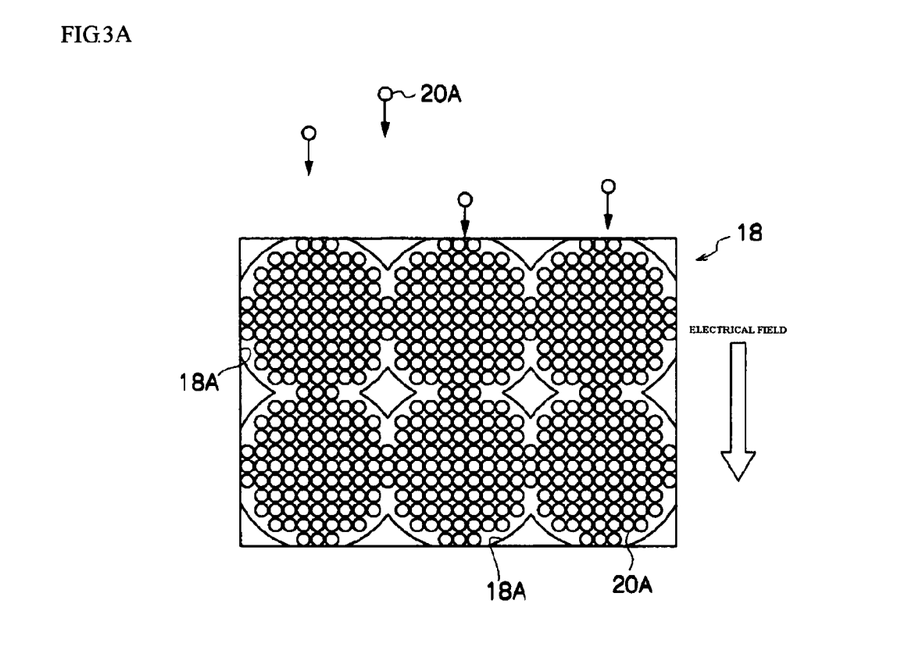
Figure 3B:
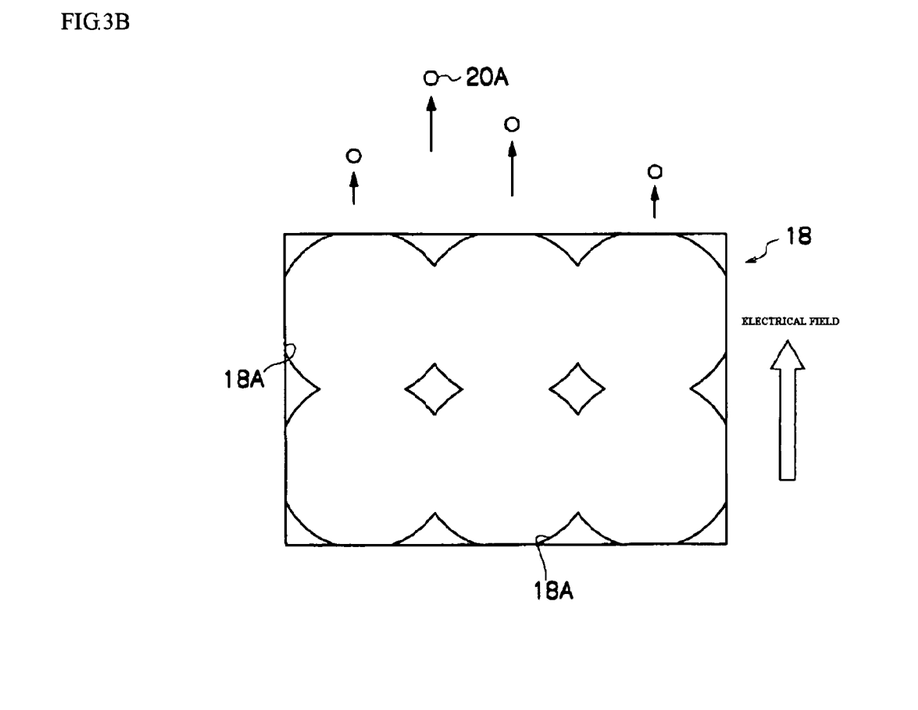

Thus, the color can be changed by varying the average refractive index by the mobile particle 20A, and the color can be controlled by the ratio of abundance of the charge mobile particle 20A, because the average refractive index is varied by the ratio of abundance. The ratio of abundance can be appropriately adjusted by the applied electrical field strength (applied voltage, amount of the current) and time.

The ratio of abundance of the charge mobile particle 20A (mobile particles) refers to the proportion of the charge mobile particle 20A presents in a unit volume of the void structure of the periodic structure 18 (the volume of the particles presents in a unit volume of the void structure).

Figure 4:
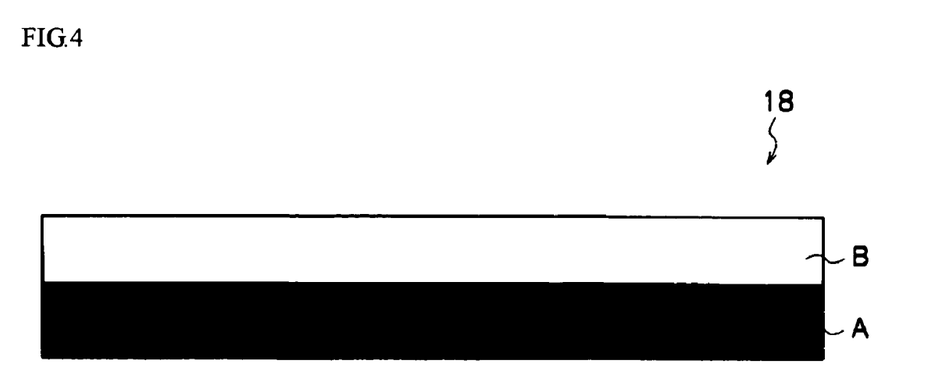
FIG. 4 is a schematic diagram showing an example in which the mobile particle are localized in the optical device (periodic structure) relating to the exemplary embodiment.

Multi-color display can also be performed by localizing the charge mobile particle 20A (mobile particles) insides the void structure of the periodic structure 18. For example, as shown in FIG. 4, when the charge mobile particle 20A (mobile particles) is allowed to enter only into the void structure at the lower part (the side of the back substrate) of the layered periodic structure 18 to localize them across the thickness of the periodic structure 18, the structural color is changed only in the region A where the charge mobile particle 20A has entered, and the region B where no charge mobile particle 20A presents shows the structural color intrinsic to the periodic structure 18. Thus, the modified structural color in the region A and the structural color in the region B intrinsic to the periodic structure 18 are mixed to display a variety of colors. Entry of the charge mobile particle 20A (mobile particles) only into the void structure at the lower part (the side of the back substrate) of the layered periodic structure can be achieved, for example, by increasing the thickness of the periodic structure 18, or by reducing the total amount of the charge mobile particle 20A to be dispersed in the dispersion medium 20 lower than (for example, about half of) the total volume of the void structure of the periodic structure 18.

The mechanism of the periodic structure 18 to show the structural color, and the mechanism of the color controlling by allowing the charge mobile particle 20A (mobile particles) to enter into the void structure of the periodic structure will be described below taking a colloidal crystal structure as an example.

Figure 5:
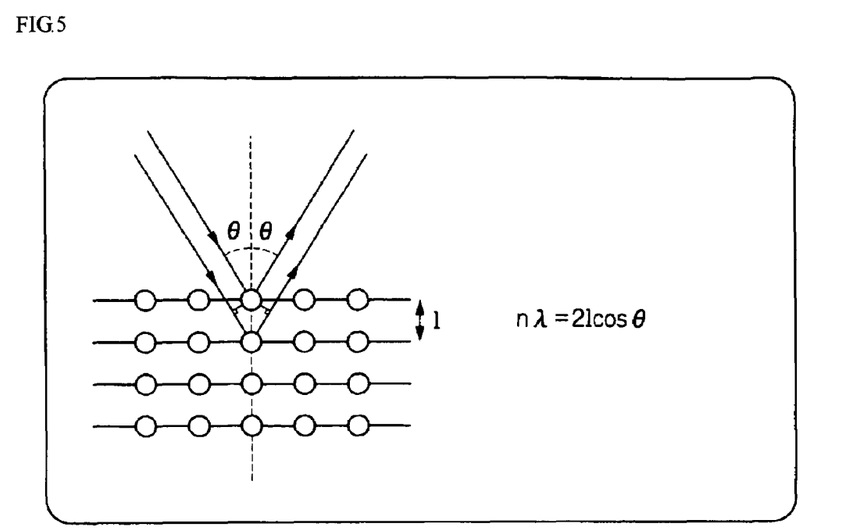
FIG. 5 illustrates Bragg's law.

First, as shown in FIG. 5, Brag's law (Formula 1 below) that is used for the crystalline structure analysis by section of the X-ray diffraction can be applied to the mechanism of the interference of visible light attributed to the colloidal crystalline structure.

$$m\lambda = 2l \cos \theta \qquad (1)$$

In the Formula 1, m, $\lambda$, l and $\theta$, respectively, denote a constant, a wavelength of light, a lattice constant and an incident angle. However, a procedure according to the X-ray diffraction cannot be applicable to the interference in the colloidal crystal structure because a ratio of scales of a wavelength and an object is largely different therebetween. That is, since the magnitude of the colloidal crystal structure is substantially same as the wavelength of visible light, the refractive index has to be taken into consideration.

Figure 6:
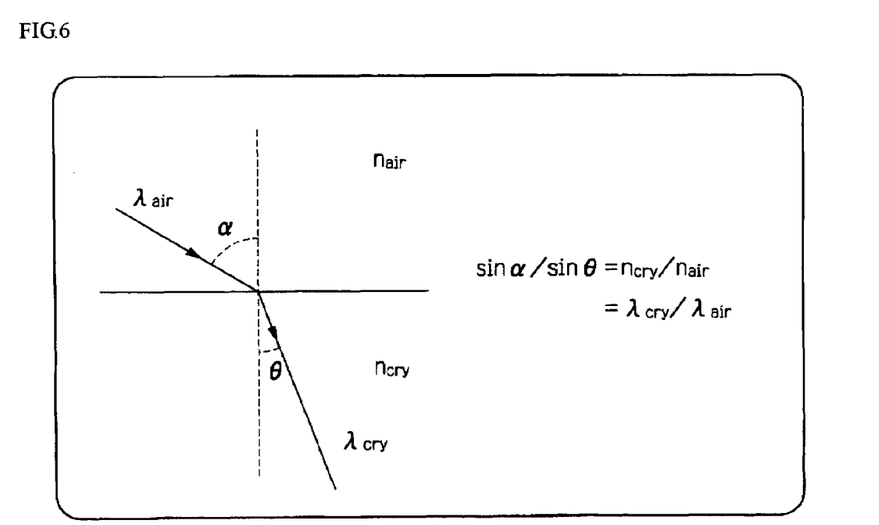
FIG. 6 illustrates Snell's law.

Therefore, as shown in FIG. 6, the relationship between a wavelength ($\lambda_{air}$) of light impinging upon the colloidal crystalline structure at an angle $\alpha$ and a wavelength ($\lambda_{cry}$) of light refracted at an angle $\theta$ by the colloidal crystal structure, when $n_{air}$ and $n_{cry}$, respectively, are the refractive index of air and the refractive index of the colloidal crystal structure, can be expressed by Formula (2) (Snell's law).

$$\frac{\sin\alpha}{\sin\theta} = \frac{n_{cry}}{n_{air}} = \frac{\lambda_{air}}{\lambda_{cry}} \qquad (2)$$

Figure 7:
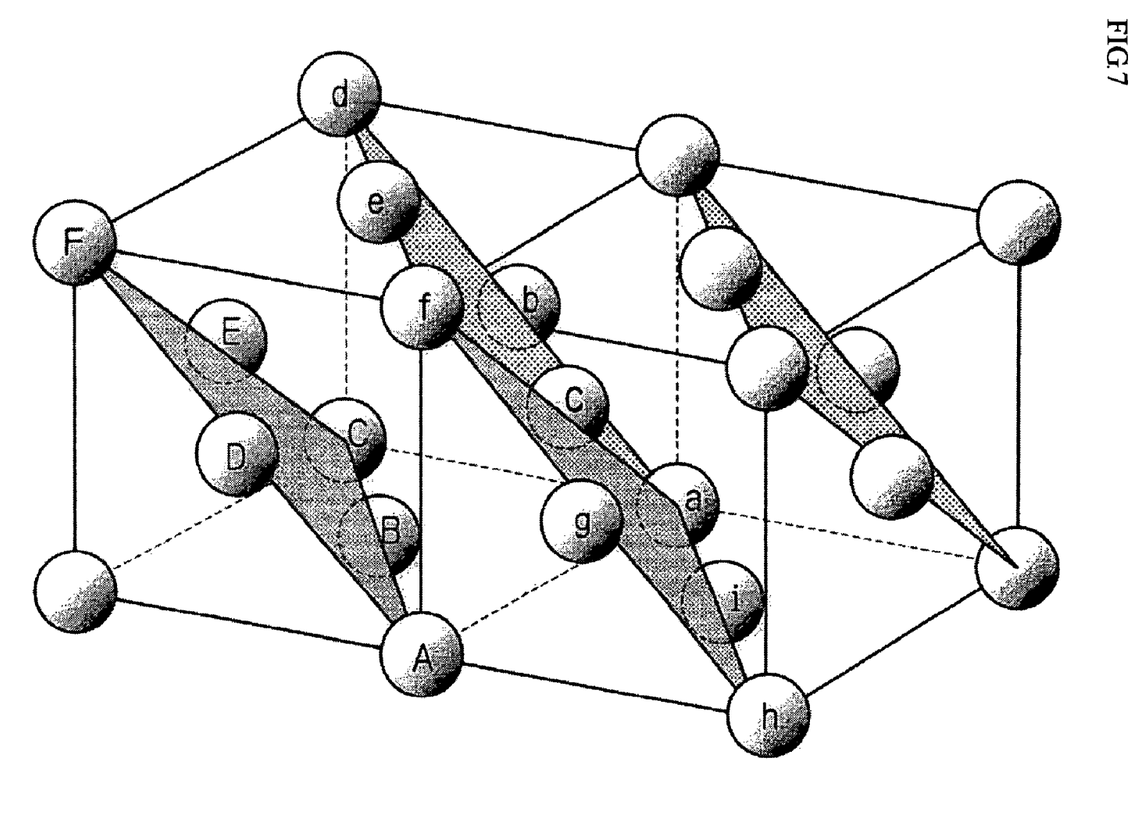
FIG. 7 is a schematic diagram showing a crystal structure of a face-centered cubic crystal.

Furthermore, as shown in FIG. 7, since the colloidal crystal structure has, as a surface layer, a (111) face of a face-centered cubic crystal that is most stable from a viewpoint of energy (an ACF face and a hdfa face in FIG. 7), when a particle diameter (volume-average particle diameter) of the colloidal particle is expressed by D, a lattice constant is represented by Formula (2'), and when summarizing the Formulas (1) and (2), Formula (3) can be obtained.

$$l = mt;epmrl;\sqrt{2/3}rlxmxD \qquad (2')$$

$$\lambda = 2\left(\frac{2}{3}\right)^{1/2} D\left[\left(\frac{n_{ave}}{n_{air}}\right)^2 - \sin^2\alpha\right]^{1/2} \qquad (3)$$

$$(n_{ave}^2 = n_{air}^2 \phi_{air} + n_{cry}^2 \phi_{colloid})$$

Here, in Formula (3), $n_{air}$ and $n_{cry}$ represent the refractive indexes of air and the colloidal particle, respectively, and $\phi_{air}$ and $\phi_{colloid}$ represent volume fractions of air and the colloidal particles, respectively. When $\lambda$ is within the range of visible light (400 to 800 nm), the structural color can be perceived.

When such a colloidal crystal structure is structurally controlled in a nano order level and a periodic structure is incorporated therein to an extent of a wavelength of light, the structural color can be controlled. A reflection wavelength obtained from the closest packed colloidal crystal structure can be expressed by Formula (4) by adding the refractive index of the mobile particles to the Formula (3).

$$\lambda = 2\left(\frac{2}{3}\right)^{1/2} D\left[\left(\frac{n^*_{ave}}{n_{solution}}\right)^2 - \sin^2\alpha\right]^{1/2} \quad (4)$$

$$(n^{*2}_{ave} = n^2_{solution}\phi_{cry} + n^2_{PC}\phi_{air} + n^2_{particle}\phi_{particle})$$

In the Formula (4), $n_{solution}$, $n_{PC}$ and $n_{particle}$ denote the refractive indexes of the dispersion medium, colloidal crystal structure and mobile particles respectively, and $\phi_{particle}$ denotes a volume fraction of the mobile particles. Furthermore, $\phi_{cry}$ is equal to $\phi_{colloid}$. When the angle of visibility of the colloidal crystal structure is neglected (for example, when the dependency of the angle of visibility is improved according to the above procedure, the angle of visibility can be neglected), the Formula (4) can be rewritten into Formula (5).

$$\lambda = 2\left(\frac{2}{3}\right)^{1/2} D\left(\frac{n^*_{ave}}{n_{solution}}\right) \quad (5)$$

Formula (5) indicates that the structural color of the colloidal crystal structure is changed by the mobile particle, and also indicates that the color is controlled by the amount (ratio of abundance) of the mobile particle.

Thus, multi-colors can be displayed by the optical device according to the exemplary embodiment, and further, a displaying with the memory properties is possible. Furthermore, the multi-color is displayed, since a magnitude of the optical composition for the multi-color display is not caused to vary, the display for each pixel can easily be made. In addition, any third section such as a color filter is not required.

Figure 8:
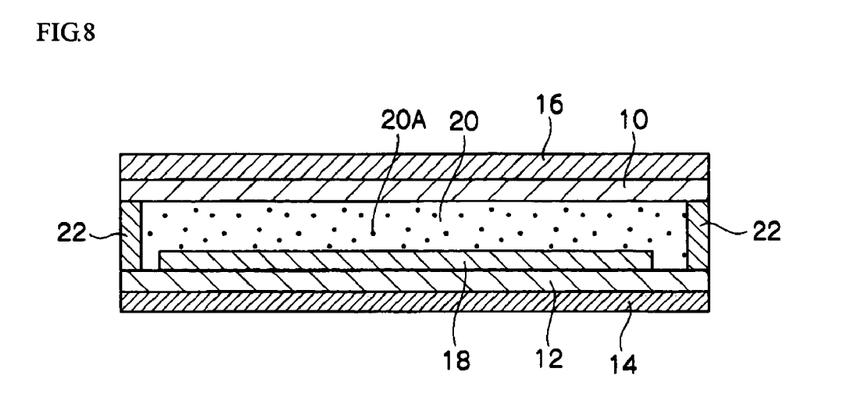
FIG. 8 is a schematic diagram showing the optical device relating to another exemplary embodiment.

In the optical device according to the exemplary embodiment, a mode where the first electrode 14 and the second electrode 16 as the electrical field applying part are brought into contact with the periodic structure 18 as the composition for multi-color display material and the dispersion medium 20 is described. However, the first electrode 14 and the second electrode 16, as far as these can apply an electrical field to the periodic structure 18, may be disposed without coming into contact therewith. For example, as shown in FIG. 8, the first electrode 14 and the second electrode 16 may be disposed on outer surfaces (faces that do not face each other) of the transparent substrate 10 and the back substrate 12, respectively.

Figure 9:
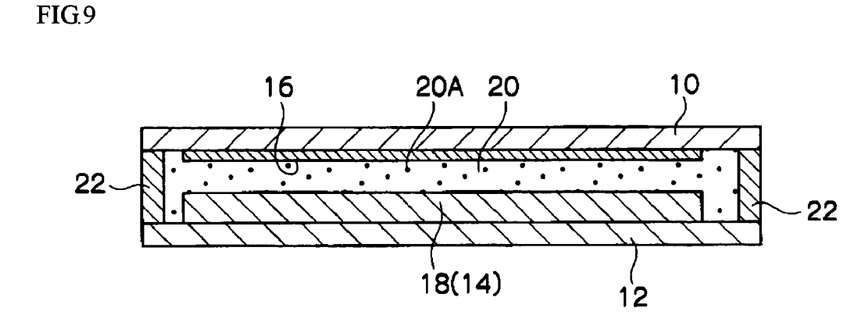
FIG. 9 is a schematic diagram showing the optical device relating to another exemplary embodiment.

Furthermore, in the optical device according to the exemplary embodiment, a mode where the first electrode 14 as the electrical field applying section is separately disposed is described. However, as shown in FIG. 9, the periodic structure 18 can also serve as the first electrode 14. Accordingly, the space can be saved.

Furthermore, the optical device according to the exemplary embodiment describes a configuration of the minimum unit (one pixel unit). However, when the minimum units are arranged in matrix, the color display can be easily carried out.

EXAMPLES

Hereinafter, the invention will be explained with reference to examples in detail. However, the scope of the invention is not limited to the examples. In the examples, an optical device having the same configuration as the optical device shown in FIG. 1 are prepared and evaluated.

Example 1

Closest packed colloidal crystals are prepared on a silicon substrate having a smooth surface by the dip-coating process using an ethanol suspension of monodisperse silica particle (trade name: SEAHOSTAR KE-W30, manufactured by Nippon Shokubai Co., Ltd.) having a volume-average particle diameter of 300 nm. The substrate is withdrawn at a rate of 0.8 μm/s, and the colloidal crystals are prepared in a thickness of 10 μm. The resulting closest packed colloidal crystals shows their structural color (blue), and are observed with a scanning electron microscope (SEM) to confirm that they form face-centered cubic lattices having a (1, 1, 1) face as the surface layer.

Next, using the colloidal crystal structure as the template, furfuryl alcohol resin is packed into the particle gaps of the structure, sintered at a temperature of 1,000° C., and the silica colloidal crystal structure is etched with hydrofluoric acid to obtain a carbon structure (periodic structure: negative structure) composed of carbon having a thickness of 5 μm. The resulting carbon structure develops its structural color (blue). It is found by SEM observation that the structure is a porous structure in which a void structure of the same shape as that of the silica colloidal crystal structure is formed, and that all the pores are linked to each other. The pores forming the void structure is 300 nm in longitudinal diameter, and the communication path (hole) between the pores forming the void structure or between the pores and outside is 90 nm in longitudinal diameter.

A gold nanoparticle-containing solution is prepared by dispersing gold nanoparticle (volume-average particle diameter: 15 nm) in water as the dispersion medium. The concentration of the gold nanoparticle in the solution is 0.1% by weight.

The resulting carbon structure (periodic structure) is attached using a silver paste adhesive to one of the face-to-face substrates on which an ITO electrode has been formed, and after packing a gold nanoparticle-containing solution therein, the circumference is sealed to prepare an optical device (see FIG. 1).

A voltage is applied to the optical device using the ITO electrode on the side to which the carbon structure (periodic structure) has been attached as the cathode, and other electrode as the anode; the structural color of the carbon structure (periodic structure) continuously changes from blue→green→yellow→red. When the voltage is subsequently applied, the structural color shifts out of the visible region, and changes into the material color (black) of the carbon structure (periodic structure). This indicates that the gold nanoparticle migrates into the voids in the carbon structure (periodic structure) to vary the refractive index and allow the continuous color controlling.

Example 2

A silica nanoparticle-containing solution is prepared by dispersing silica nanoparticle (volume-average particle diameter: 5 nm) in water as the dispersion medium. The concentration of the silica nanoparticle in the solution is 10% by weight.

An optical device is prepared in the same manner as Example 1, except that the silica nanoparticle-containing solution is used.

A voltage is applied to the optical device using the ITO electrode on the side to which the carbon structure (periodic structure) has been attached as the anode, and other electrode as the cathode; the structural color of the carbon structure (periodic structure) continuously changes from blue→green→yellow→red. When the voltage is subsequently applied, the structural color shifts out of the visible region, and changes into the material color (black) of the carbon structure (periodic structure). This indicates that the continuous color controlling can be achieved by variation in the refractive index due to the migration of the silica nanoparticle into the voids in the carbon structure (periodic structure).

Example 3

A titanium oxide nanoparticle-containing solution is prepared by dispersing titanium oxide nanoparticle (volume-average particle diameter: 5 nm, trade name: Super Titania, manufactured by Showa Denko K.K.) in water as the dispersion medium. The concentration of the titanium oxide nanoparticle in the solution is 5% by weight.

An optical device is prepared in the same manner as Example 1, except that the titanium oxide nanoparticle-containing solution is used.

A voltage is applied to the optical device using the ITO electrode on the side to which the carbon structure (periodic structure) has been attached as the anode, and other electrode as the cathode; the structural color of the carbon structure (periodic structure) continuously changes from blue→green→yellow→red. When the voltage is subsequently applied, the structural color shifts out of the visible region, and changes into the material color (black) of the carbon structure (periodic structure). This indicates that the continuous color controlling can be achieved by variation in the refractive index due to the migration of the titanium oxide nanoparticle into the voids in the carbon structure (periodic structure).

Example 4

Closest packed colloidal crystals are prepared on an ITO substrate by the dip-coating process using an ethanol suspension of a monodisperse polystyrene particle (trade name: Estapol ES-K030, manufactured by Merck & Co., Inc.) having a volume-average particle diameter of 300 nm. The substrate is withdrawn at a rate of 0.5 μm/s, and the colloidal crystals are prepared in a thickness of 10 μm. The resulting closest packed colloidal crystals shows their structural color (green). The crystals are observed with a scanning electron microscope (SEM) to confirm that they form face-centered cubic lattices having a (1, 1, 1) face as the surface layer.

Using the colloidal crystal structure as the template, an aqueous suspension of a $SiO_2$ particle (volume-average particle diameter of $SiO_2$: 6 nm, concentration: 10% by weight, trade name: Cataloid, manufactured by Catalysts & Chemicals Industries Co., Ltd.) is packed in the particle gaps of the structure by the dip-coating process, sintered at a temperature of 500° C. for 1 hour to eliminate the colloidal crystal structure and obtain a silica structure (periodic structure: negative structure) having a thickness of 5 μm. The resulting silica structure develops the structural color (blue). It is found by SEM observation that the structure is a porous structure in which a void structure of the same shape as that of the polystyrene colloidal crystal structure is formed, and that all the pores are linked to each other. The pores forming the void structure is 300 nm in longitudinal diameter, and the communication path (hole) between the pores forming the void structure or between the pores and outside is 90 nm in longitudinal diameter.

An optical device is prepared in the same manner as Example 2, except that the silica structure (periodic structure) is used.

A voltage is applied to the optical device using the ITO electrode on the side to which the silica structure (periodic structure) has been attached as the anode, and other electrode as the cathode; the structural color of the silica structure (periodic structure) continuously changes from blue→green→yellow→red. When the voltage is subsequently applied, the structural color shifts out of the visible region to change into the material color (transparent) of the silica structure (periodic structure), and the backside color is expressed. This indicates that the continuous color controlling can be achieved by variation in the refractive index due to the migration of the silica particle into the voids in the silica structure (periodic structure).

Example 5

An optical device is prepared in the same manner as Example 1, except that the silica structure obtained in the same manner as Example 4 is used.

A voltage is applied to the optical device using the ITO electrode on the side to which the silica structure (periodic structure) has been attached as the cathode, and other electrode as the anode; the structural color of the silica structure (periodic structure) continuously changes from blue→green→yellow→red. When the voltage is subsequently applied, the structural color shifts out of the visible region to change into the material color (transparent) of the silica structure (periodic structure), and the backside color is expressed. This indicates that the continuous color controlling can be achieved by variation in the refractive index due to the migration of the gold nanoparticle into the voids in the silica structure (periodic structure).

Example 6

An optical device is prepared in the same manner as Example 3, except that the silica structure obtained in the same manner as Example 4 is used.

A voltage is applied to the optical device using the ITO electrode on the side to which the silica structure (periodic structure) has been attached as the anode, and other electrode as the cathode; the structural color of the silica structure (periodic structure) continuously changes from blue→green→yellow→red. When the voltage is subsequently applied, the structural color shifts out of the visible region to change into the material color (transparent) of the silica structure (periodic structure), and the backside color is expressed. This indicates that the continuous color controlling can be achieved by variation in the refractive index due to the migration of the titanium oxide nanoparticle into the voids in the silica structure (periodic structure).

Example 7

Closest packed colloidal crystals are prepared on an ITO substrate by the dip-coating process using an ethanol suspension of a monodisperse polystyrene particle (trade name: Estapol ES-K040, manufactured by Merck & Co., Inc.) having a volume-average particle diameter of 400 nm. The substrate is withdrawn at a rate of as low as 0.5 μm/s, and the colloidal crystals are prepared in a heavy thickness of 200 μm.

The resulting closest packed colloidal crystals shows their structural color (red), and are observed with a scanning electron microscope (SEM) to confirm that they form face-centered cubic lattices having a (1, 1, 1) face as the surface layer.

Using the colloidal crystal structure as the template, an aqueous suspension of a $SiO_2$ particle (volume-average particle diameter of $SiO_2$: 6 nm) is packed in the particle gaps of the structure by the dip-coating process, sintered at a temperature of 500° C. for 1 hour to eliminate the colloidal crystal structure and obtain a silica structure (periodic structure: negative structure) having a thickness of 15 μm. The resulting silica structure develops the structural color (red). It is found by SEM observation that the structure is a porous structure in which a void structure of the same shape as that of the polystyrene colloidal crystal structure is formed, and that all the pores are linked to each other. The pores forming the void structure is 400 nm in longitudinal diameter, and the communication path (hole) between the pores forming the void structure or between the pores and outside is 100 nm in longitudinal diameter.

An optical device is prepared in the same manner as Example 2, except that the silica structure is used.

A voltage is applied to the optical device using the ITO electrode on the side to which the silica structure (periodic structure) has been attached as the anode, and other electrode as the cathode; the structural color of the silica structure (periodic structure) continuously changes from red→yellow→orange→magenta. This is because the silica nanoparticle enters only into the lower part of the void structure of the thick silica structure, which develops the mixed color of the structural color of the silica structure and the structural color modified by the silica nanoparticles. This indicates that mixed color can be expressed.

Example 8

An ITO glass substrate electrode on which the silica structure is laminated, which is obtained in the same manner as Example 4, and an untreated ITO glass substrate electrode are faced each other, and after packing a titanium oxide nanoparticle-containing solution therein, the circumference is sealed. On the rear surface of the device, an optical device having a black substrate is prepared.

A voltage is applied to the optical device using the side of the silica structure laminated electrode as the cathode, and other electrode as the anode; the structural color of the silica structure electrode continuously changes from blue→green→yellow→red. When the voltage is subsequently applied, the structural color of the silica structure electrode shifts out of the visible region to change into transparent, and the backside black color is expressed. When the voltage is reversed, the order of the color change is also reversed and changes from black→red→yellow→green→blue. This indicates that the phenomenon is reversible. More specifically, the expression of the structural color and the backside color of the structure electrode is reversible.

Example 9

Using polystyrene particle (trade name: Estapol ES-K020, manufactured by Merck & Co., Inc.) having a volume-average particle diameter of 200 nm as the template particles, an ITO glass substrate electrode on which the silica structure is laminated, which is obtained in the same manner as Example 4, and an untreated ITO glass substrate electrode are faced each other, and after packing a titanium oxide nanoparticle-containing solution therein, the circumference is sealed. On the rear surface of the device, an optical device having a black substrate is prepared. At this point the structural color of the silica structure in the optical device is transparent because it is out of the region of visible light, and the backside black color is expressed. It is found by SEM observation that the structure is a porous structure in which a void structure of the same shape as that of the polystyrene colloidal crystal structure is formed, and that all the pores are linked to each other. The pores forming the void structure is 200 nm in longitudinal diameter, and the communication path (hole) between the pores forming the void structure or between the pores and outside is 70 nm in longitudinal diameter.

A voltage is applied to the optical device using the side of the silica structure laminated electrode as the cathode, and other electrode as the anode; the structural color of the silica structure electrode continuously changes from black→blue→green→yellow→red. When the voltage is reversed, the order of the color change is also reversed and changes from red→yellow→green→blue→black. This indicates that the phenomenon is reversible. More specifically, the expression of the structural color and the backside color of the structure electrode is reversible.

Example 10

Closest packed colloidal crystals are prepared on an ITO substrate by the dip-coating process using an ethanol suspension of a monodisperse polystyrene particle (trade name: Estapol ES-K030, manufactured by Merck & Co., Inc.) having a volume-average particle diameter of 300 nm. The substrate is withdrawn at a rate of 0.5 μm/s, and the colloidal crystals are prepared in a thickness of 10 μm. The resulting closest packed colloidal crystals shows their structural color (green), and are observed with a scanning electron microscope (SEM) to confirm that they form face-centered cubic lattices having a (1, 1, 1) face as the surface layer.

Using the colloidal crystal structure as the template, an aqueous suspension of a $SiO_2$ particle (volume-average particle diameter of $SiO_2$: 6 nm, concentration: 10% by weight, trade name: Cataloid, manufactured by Catalysts & Chemicals Industries Co., Ltd.) is packed into the particle gaps of the structure by the dip-coating process, sintered at a temperature of 500° C. for 1 hour to eliminate the colloidal crystal structure and obtain a silica structure (periodic structure: negative structure) having a thickness of 5 μm. The resulting silica structure develops the structural color (blue). It is found by SEM observation that the structure is a porous structure in which a void structure of the same shape as that of the polystyrene colloidal crystal structure is formed, and that all the pores are linked to each other. The pores forming the void structure is 300 nm in longitudinal diameter, and the communication path (hole) between the pores forming the void structure or between the pores and outside is 90 nm in longitudinal diameter.

The resulting silica structure is laminated on a glass substrate, and the glass substrate and other glass substrate are faced each other. After packing a paramagnetic metallic oxide (ferrite) nanoparticle-containing solution therein, the circumference is sealed to prepare an optical device.

When a permanent magnet is brought close to the silica structure of the optical device, the structural color of the silica structure continuously changes from blue→green→yellow→red. This indicates that continuous color controlling can be achieved by variation in the refractive index by the intrusion of the magnetic particle into the voids in the silica structure.

What is claimed is:

1. A composition for multi-color display material, comprising:
   a periodic structure having a void structure inside that communicates with the outside; and
   a mobile particle that has a volume-average particle diameter of 1 nm to 1 μm, and is selectively disposed inside or outside of the void structure of the periodic structure,
   wherein the periodic structure is a porous structure.

2. The composition for multi-color display material of claim 1, wherein the material of the periodic structure is colored.

3. The composition for multi-color display material of claim 1, wherein the material of the periodic structure is not colored.

4. The composition for multi-color display material of claim 1, wherein the mobile particle is a metallic nanoparticle.

5. The composition for multi-color display material of claim 4, wherein the metallic nanoparticle is at least one selected from gold, silver, titanium oxide, silica and zinc oxide.

6. A displaying method for an optical device comprising
   a pair of substrates;
   a composition for multi-color display material located between the pair of substrates, comprising a periodic structure having a void structure inside that communicates with the outside, and a mobile particle that has a volume-average particle diameter of 1 nm to 1 μm, and is selectively disposed inside or outside of the void structure of the periodic structure; and
   a selection and arrangement section that selectively disposes the mobile particle inside or outside of the void structure of the periodic structure,
   the method comprising:
   transferring the mobile particle to the inside of the void structure of the periodic structure, and
   transferring the mobile particle to outside of the void structure of the periodic structure,
   wherein the periodic structure is a porous structure.

7. The displaying method for an optical device of claim 6, wherein multi-color display is performed by variation in the ratio of abundance of the mobile particle inside of the void structure of the periodic structure.

8. The displaying method for an optical device of claim 6, wherein multi-color display is performed by localizing the mobile particle inside of the void structure of the periodic structure.

9. The displaying method for an optical device of claim 6, wherein the material color of the periodic structure is displayed when the structural color of the periodic structure is not colored, or when the structural color of the periodic structure shows no coloration due to the transfer of the mobile particle to the inside of the void structure of the periodic structure.

10. An optical device, comprising:
    a pair of substrates;
    a composition for multi-color display material located between the pair of substrates, and comprising a periodic structure having a void structure inside that communicates with the outside, and a mobile particle that has a volume-average particle diameter of 1 nm to 1 μm, and is selectively disposed inside or outside of the void structure of the periodic structure; and
    a selection and arrangement section that selectively disposes the mobile particle inside or outside of the void structure of the periodic structure,
    wherein the periodic structure is a porous structure.

11. The optical device of claim 10, wherein the material of the periodic structure is colored.

12. The optical device of claim 10, wherein the material of the periodic structure is not colored.

13. The optical device of claim 10, wherein the mobile particle is a metallic nanoparticle.

14. The optical device of claim 13, wherein the metallic nanoparticle is at least one selected from gold, silver, titanium oxide, silica and zinc oxide.

15. The optical device of claim 10, wherein one of the pair of substrates is colored or has a colored material.

* * * * *